Jan. 21, 1947.　　　G. R. TREMOLADA　　　2,414,677
DRAWWORK BRAKE
Filed July 10, 1944　　　3 Sheets-Sheet 2
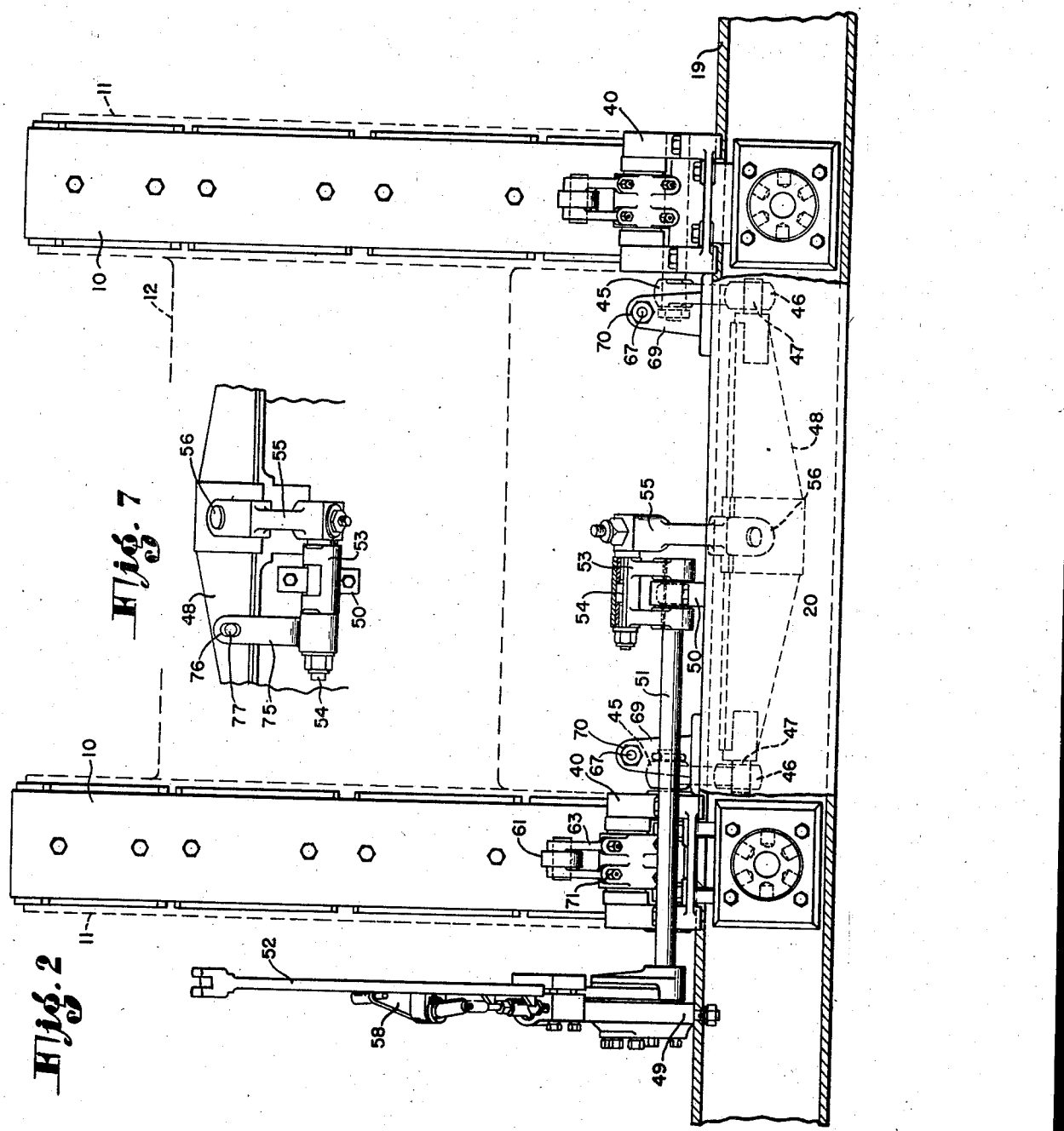
INVENTOR.
GUGLIELMO R. TREMOLADA
BY
ATTORNEY Jan. 21, 1947.　　　G. R. TREMOLADA　　　2,414,677
DRAWWORK BRAKE
Filed July 10, 1944　　　3 Sheets-Sheet 3
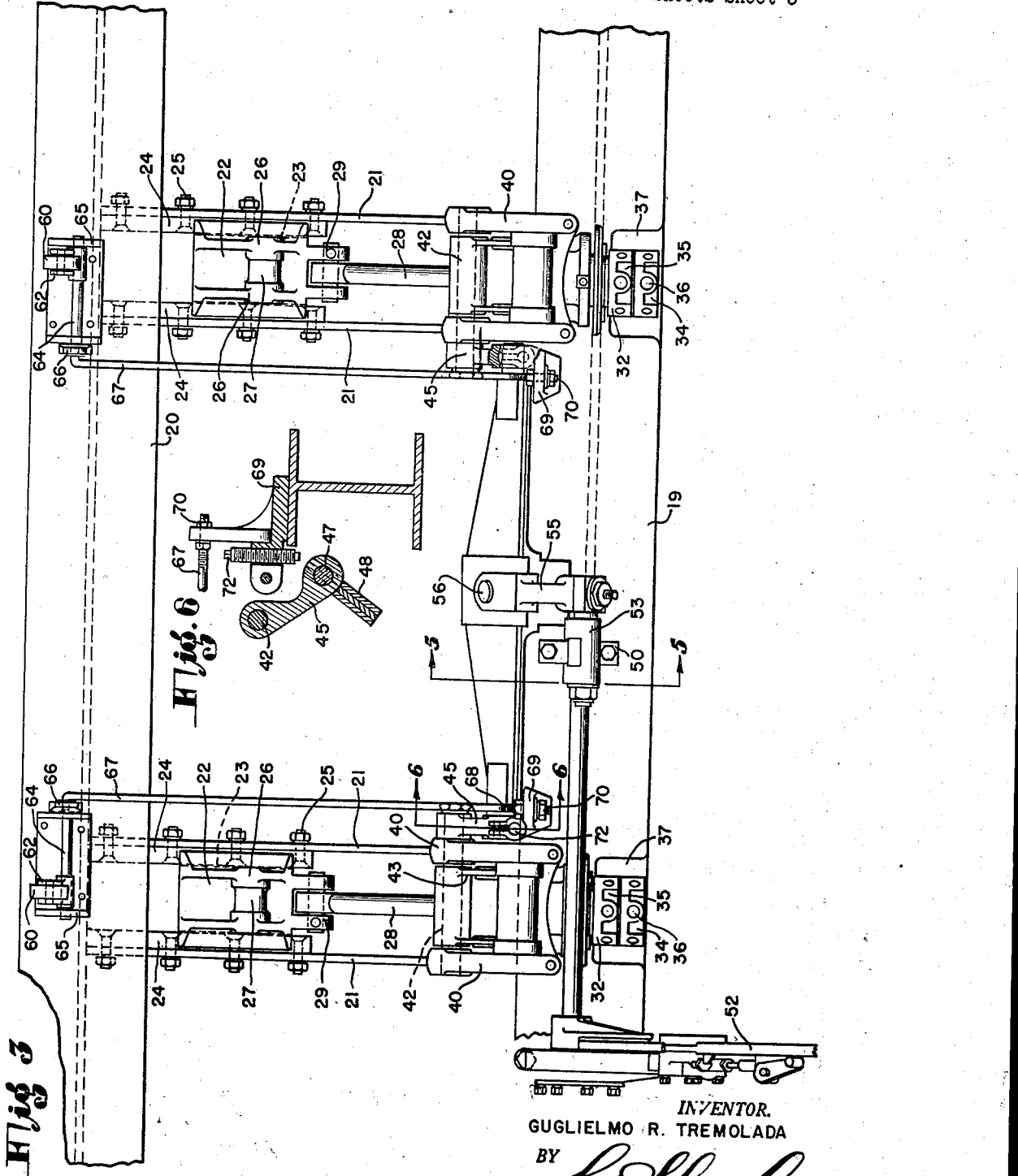
INVENTOR.
GUGLIELMO R. TREMOLADA
BY 
ATTORNEY Patented Jan. 21, 1947

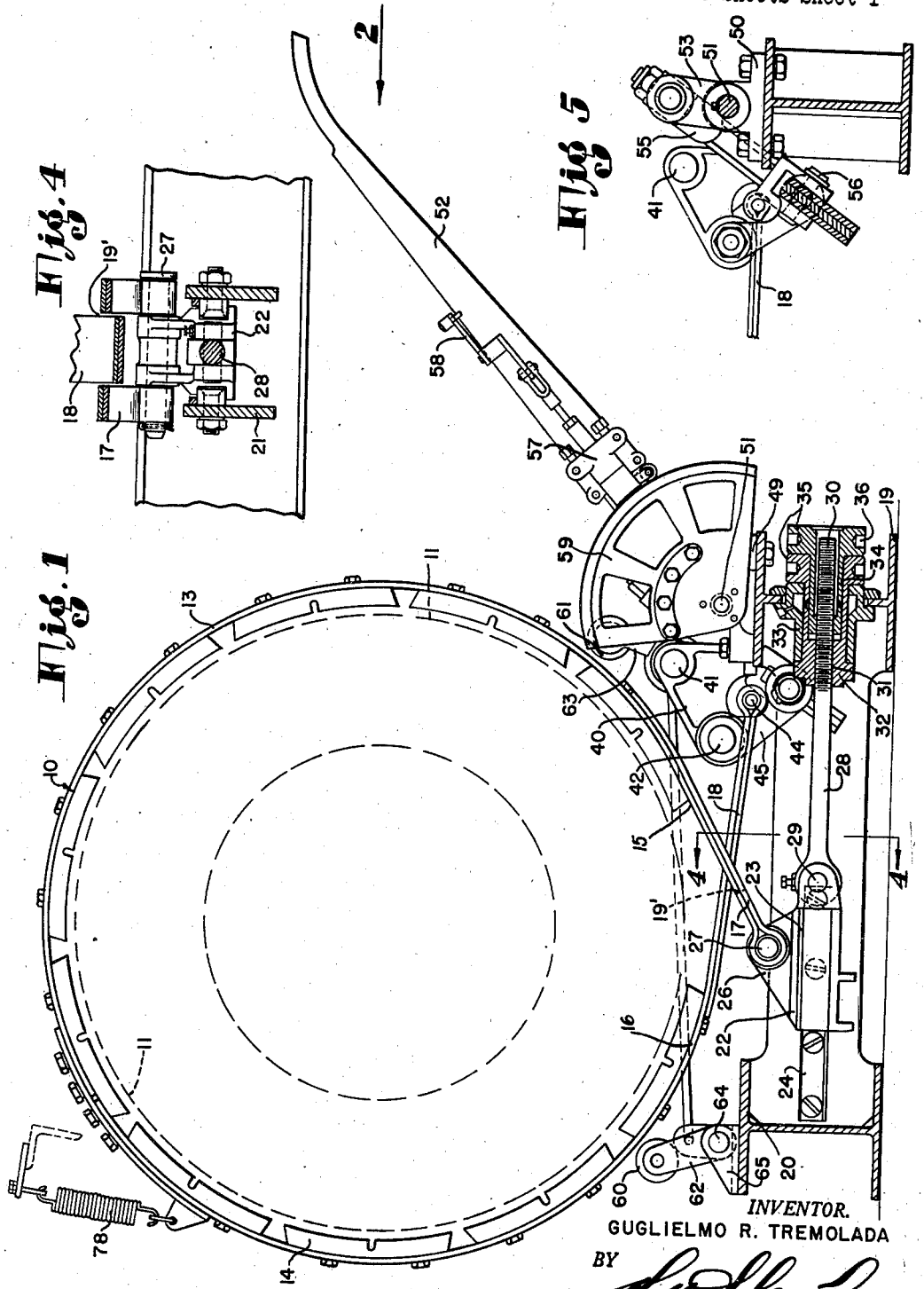

2,414,677

UNITED STATES PATENT OFFICE 2,414,677

DRAWWORKS BRAKE

Guglielmo R. Tremolada, Los Angeles, Calif., assignor to Emsco Derrick & Equipment Company, Los Angeles, Calif., a corporation of California Application July 10, 1944, Serial No. 544,251

20 Claims. (Cl. 188—77)

My invention relates to band brakes of the type employed on drawworks of oil well derricks and relates in particular to a dual brake wherein both bands are ordinarily simultaneously operated, but wherein either of the brakes will be actuated in event of the failure of the other brake.

It is an object of the invention to provide a massive or large capacity brake for the cable spool of a drawworks which occupies smaller space than is now required for drawworks brakes of similar capacity. A feature of this new brake structure is that the brake operating mechanism is for the most part brought into a position wherein it is protected by the structure and other heavy parts of the drawworks. This desirable result, however, is accomplished without sacrifice of any other desirable quality in the brake.

It is an object of the invention to provide a drawworks brake wherein the brake band extends nearly entirely around the brake drum, thereby providing a larger area of brake shoe in contact with the brake drum than is generally employed in brakes of this type.

A further object of the invention is to provide a drawworks brake wherein the band tightening and adjusting mechanism of the brake is disposed in the floor structure of the drawworks where it is protected against damage during transportation of the drawworks, and a further object is to provide a simple means for adjusting the brake band from a position in front of the drawworks, the adjusting means being accessible for ease of adjustment, thereby contributing to better brake service by reason of the fact that the operator, with little trouble, may make frequent adjustments which are at times neglected where the adjustment of the brake band is difficult.

A further object of the invention is to provide a drawworks brake having a novel positioning of the brake bands and a simple and effective means for supporting these brake bands, and to provide an arrangement which makes possible the removal of the brake bands for purpose of replacing the brake blocks, without necessity of removing the band operating mechanism.

A further object of the invention is to provide a drawworks brake wherein a new and effective equalizing mechanism is employed, this mechanism being so arranged that a failure of either one of the brakes will not prevent the remaining brake from operating in response to movement of the brake operating lever by the driller.

Further objects and advantages of the invention will be brought out in the following part of the specification.

Referring to the drawings which are for illustrative purposes only,

Fig. 1 is a side elevation of a preferred form of my invention, the lower portion of the structure being sectioned.

Fig. 2 is a front elevation taken from the position indicated by the arrow 2 of Fig. 1.

Fig. 3 is a plan view corresponding to Fig. 2 but with the brake bands removed so as to show the underlying parts.

Fig. 4 is a fragmentary section taken as indicated by the line 4—4 of Fig. 1.

Fig. 5 is a fragmentary sectional view taken as indicated by the line 5—5 of Fig. 3.

Fig. 6 is a fragmentary sectional view taken as indicated by the line 6—6 in Fig. 3.

Fig. 7 is a fragmentary plan view showing an alternative connection between the actuating shaft and the equalizing bar.

In Figs. 1 and 2 I show brake bands 10 disposed in spaced relation so as to engage the drums 11 of a cable spool 12, shown in phantom lines in these figures. Each band 10 comprises a steel strap 13 of spring steel capable of holding the substantially circular form into which it is bent, with blocks 14 of friction brake lining material secured thereto. The end portions 15 and 16 of the brake band 10 are brought into close proximity below the drum 11 and these end portions 15 and 16 of the band 10 include extensions 17 and 18 which cross at a point below the drum 11. The extension 17 is shown with a slot 19' therein, through which the reduced extension 18 extends.

In Figs. 1, 2, and 3 of the drawings I show front and rear structural members 19 and 20 which lie in a substantially horizontal plane below the spool 12 and comprise part of the supporting structure of the rotary drawworks on which the spool 12 is mounted in the customary manner by shafts, bearings, etc., not herein shown since the same constitute well known art. In positions below the drums 10 pairs of plates 21 are extended between the structural members 19 and 20 to contribute to the forming of guides for anchor blocks 22. The blocks 22 have horizontal channels 23 in the sides thereof to engage tracks 24 secured to the vertical faces of the plates 21 by bolts 25. The anchor blocks 22 have upwardly extending walls 26 which carry cross pins 27 to engage the end extensions 17 of the bands 10, which ends 17 are referred to as the dead extensions or dead ends 17 of the brake bands since they remain stationary during the operation of the brakes and are moved only for purpose of adjustment of the brakes to take up for wear.

Adjustment of the brakes is accomplished by moving the blocks 22 in the horizontal guides formed by the bars or tracks 24. This is accomplished by the following simple adjustment means which may be operated from the front of the drawworks structure without difficulty.

Screw members 28 are connected by hinge means 29 to the front ends of the blocks 22. Threads 30 on the forward ends of the members 28 are screwed into the threaded openings 31 of sleeve nuts 32 which are turntable within cylindric supports 33 carried by the front structural member 19. Sleeve lock nuts 34 extend into the sleeve nuts 32 and have threaded engagement with the members 28. On the outer ends of the sleeve nuts 32 and 34 there are cylindric bodies 35 with radial openings 36 arranged to be engaged by a bar, to turn the sleeve nuts and thereby adjust the positions of the blocks 22 by longitudinal movement of the screw members 28. As shown in Fig. 3, notches 37 are provided in the upper flange of the structural member 19 above the cylindric bodies 35 of the sleeve nuts 32 and 34, through which a rod may be operated to turn these members 32 and 34 for purpose of adjustment.

On the upper face of the structural member 19 in alignment with the band 10 there are brackets 40, each supporting a pin 41 and a shaft 42. Each shaft has fixed thereon a bifurcated lever 43 carrying a pin 44 around which the extension 18 of a brake band 10 is looped. The levers 43 are referred to as primary levers for the reason that they are connected to the live ends or extensions 18 of the brake bands and accomplish the tightening of the bands 10 around the drums when they are swung in proper direction. On the other end of each shaft member 42 a secondary lever 45 is fixed. Movement received by these secondary levers 45 is transmitted through the shafts 42 to the primary levers 43. The swinging ends of the levers 45 have universal joints 46 which, as shown in Fig. 2, receive the ends 47 of a cross bar 48 which extends substantially horizontally between the swinging ends of the levers 45.

As further shown in Fig. 2, bearing blocks 49 and 50 are mounted on the upper face of the structural member 19 to support an actuating shaft 51 which extends from one end of the cable spool 12 to a point adjacent the center of the spool 12. This shaft 51 is rotated by means of a lever 52 in the form of a handle adapted to be moved by the driller from a substantially vertical position rightward to the position in which it is shown in Fig. 1 to accomplish actuation of the brakes by constricting the bands around the drums 11. An actuating lever 53 is fixed on the inner end of the shaft 51 in a position to straddle the bearing block 50. This actuating lever 53 supports a shaft or pin 54 to connect a link 55 to the lever 53. This link 55 constitutes a means for connecting the lever 53 to the central portion of the cross bar 48. As shown in Fig. 5, the link 55 is connected to the cross bar 48 by pivot means consisting of a pin 56 which passes through the cross bar and the bifurcated lower end of the link 55. When the shaft 51 is rotated for the purpose of actuating the brakes, the link 55 pulls upward on the center of the cross bar 48 and transmits movement to the secondary levers 45. Since the cross bar 48 may swing on the pivot means 56, the force transmitted from the lever 53 through the link 55 will be equally divided between the secondary levers 45, thereby equalizing the pressures applied to the brakes. The handle 52 carries locking means 57, operated through use of its handle 58 to engage a segment 59 which forms a part of the bearing block 49 for the outer end of the shaft 51, making it possible for the driller to readily lock the brakes by locking the handle 52 in a position such as shown in Fig. 1.

The brake band 10 is shown constricted in Fig. 1. It is therefore raised slightly from supports 60 and 61 comprising rollers mounted on adjusting means consisting of levers 62 and 63. The levers 62 are fixed on shafts 64 supported by brackets 65 which are mounted on the structural member 20 as shown in Figs. 1 and 3. On these shafts 64 are levers 66 from which adjusting links 67 extend forward to the front structural member 19 where the threaded forward ends 68 thereof extend through brackets 69 and have thereon adjusting nuts 70 so that by longitudinal movement of the links 67, the levers 62 may be swung so as to move the rollers 60 upward and inward to engage the brake band 10 when it is in expanded condition. The levers 63, which support the rollers 61, are swingable on the pins 41 of the brackets 40 and may be clamped in desired position by clamping nuts 71 so that the rollers 61 will cooperate with the rollers 60 to hold the brake band in a position concentric to the drums 11 when the bands 10 are expanded. When the bands 10 are contracted by actuation of the brake mechanism, they will be lifted away from the supports 60 and 61 as shown in Fig. 1.

The invention provides means for limiting the forward swinging movement of the primary levers 43 so that in event of failure of one of the brakes—for example, breakage of one of the brake bands—the actuating mechanism will continue to actuate the remaining brake band and thereby control rotation of the cable spool. This effect I prefer to accomplish by limiting the forward movement (upward movement) of the ends of the cross bar 48. This stopping of the upward movement of the ends of the cross bar 48 limits the angle to which the cross bar 48 may swing on the pivot means 56. To carry out this limitation, the brackets carry vertically disposed adjusting screws 72 disposed above the ends 47 of the cross bar 48 in position to be engaged by the swinging ends of the levers 45 which receive the ends 47 of the cross bar 48. Should there be breakage of one of the brake bands, or a part of the leverage system leading from an end of the bar 48 to such brake band, the corresponding end of the bar 48 will swing into engagement with the stop and thereafter the upward pull exerted through the link 55 will swing the opposite end of the cross bar 48, thereby applying the opposite brake mechanism in the customary manner.

In Fig. 7 I show an alternative means for limiting the angular movement of the cross bar 48 on the pivot means 56. This view Fig. 7 is similar to the central portion of Fig. 3 showing the lever 53 and the link 55. In Fig. 7 the shaft or pin 54 is extended and a separate link 75 is mounted on the end of the shaft 54 opposite the link 55. This link 75 extends downward so that its lower end will overlap a portion of the cross bar 48, and in the lower end of the link 75 there is a slot 76 which cooperates with a pin 77 carried by the cross bar 48 to provide a loose connection between the cross bar 48 and the lever 53, this loose connection permitting a limited angular movement of the cross bar 48 on the pivot means 56. Accordingly, should restraint be removed from one end of the cross bar 48, it will swing on the pin 56 until the pin 77 engages an end of the slot 76. Thereafter the angle of the cross bar 48 cannot change and the cross bar 48 will be caused to move bodily in response to the swinging of the actuating lever 53 in response to rotation of the shaft 51.

In the brake mechanism disclosed the brake actuating and adjusting parts are mounted on or in the floor or supporting structure of the drums. The brake actuating mechanism consisting of the shaft 51 and the parts moved thereby, is supported below the front portions of the brake drums. The adjusting means for the brake bands are located at the front of the drawworks, and in a position where they may be readily manipulated in the manner previously described in detail. Furthermore, it is possible to remove the brake bands for the purpose of replacing the brake blocks without dismantling the actuating or adjusting mechanism. It will be perceived that the pins 27 and 44 may be readily removed so that the brake bands may be taken out.

When the brake bands 10 are quite large, additional spring support may be provided therefor as shown at 78 in Fig. 1.

I claim as my invention:

1. In a brake device for a cable spool having a pair of brake drums at the ends thereof and a supporting structure in a plane below said spool, the combination of: a pair of brake bands, each surrounding one of said drums and having live and dead extensions which cross below said drum, one of said extensions passing through an opening in the other of said extensions; guide means extending substantially horizontally in said supporting structure under said drums; anchor blocks movably supported by said guide means and connected to the dead extensions of said bands; a pair of primary levers connected to the live extensions of said bands swingable so as to constrict said bands around said drum; a pair of secondary levers connected to said primary levers; a cross bar extending between the ends of said secondary levers; flexible joints connecting the ends of said bar to said ends of said secondary levers; an actuating shaft extending horizontally below the front portion of said spool from one end of the spool to a point opposite the center thereof; an actuating lever fixed on said shaft and connected to the central portion of said bar by pivot means; lever means on said shaft operable to rotate the same; means to limit the rotation of said bar on said pivot means; and adjusting screws extending forward from said anchor blocks and being actuatable at the front ends thereof to move said anchor blocks in said guide means to adjust said bands.

2. In a brake device for a cable spool having a pair of brake drums at the ends thereof and a supporting structure in a plane below said spool, the combination of: a pair of brake bands, each surrounding one of said drums and having live and dead extensions which cross below said drum; adjustable anchor means to anchor the dead extensions of said bands; adjustment means carried by said supporting structure for adjusting said anchor means, said adjustment means having a part exposed at the front of said supporting structure; a pair of primary levers connected to the live extensions of said bands swingable so as to constrict said bands around said drums; a pair of secondary levers connected to said primary levers; a cross bar extending between the ends of said secondary levers; flexible joints connecting the ends of said bar to said ends of said secondary levers; an actuating shaft extending horizontally below the front portion of said spool from one end of the spool to a point opposite the center thereof; an actuating lever fixed on said shaft and connected to the central portion of said bar by pivot means; lever means on said shaft operable to rotate the same; and means to limit the rotation of said bar on said pivot means.

3. In a brake device for a cable spool having a pair of brake drums at the ends thereof and a supporting structure in a plane below said spool, the combination of: a pair of brake bands, each surrounding one of said drums and having live and dead extensions which cross below said drum; means to anchor the dead extensions of said bands; a pair of primary levers connected to the live extensions of said bands swingable so as to constrict said bands around said drums; a pair of secondary levers connected to said primary levers; a cross bar extending between the ends of said secondary levers; flexible joints connecting the ends of said bar to said ends of said secondary levers; an actuating shaft extending horizontally below the front portion of said spool from one end of the spool to a point opposite the center thereof; an actuating lever fixed on said shaft and connected to the central portion of said bar by pivot means; lever means on said shaft operable to rotate the same; and means to limit the rotation of said bar on said pivot means comprising a second lever mounted on said shaft in a position spaced from said actuating lever and providing connection of said shaft and said bar, said connection being loose so as to permit a limited angular movement of said bar.

4. In a brake device for a cable spool having a pair of brake drums at the ends thereof and a supporting structure in a plane below said spool, the combination of: a pair of brake bands, each surrounding one of said drums and having live and dead extensions which cross below said drum; means to anchor the dead extensions of said bands; a pair of primary levers connected to the live extensions of said bands swingable so as to constrict said bands around said drums; a pair of secondary levers connected to said primary levers; a cross bar extending between the ends of said secondary levers; flexible joints connecting the ends of said bar to said ends of said secondary levers; an actuating shaft in spaced relation to said bar; actuating lever means on said shaft connected to the central portion of said bar so that by rotation of said shaft said lever means will move said bar and swing said secondary and primary levers to constrict said bands, the connection of said lever means to said bar permitting a small swinging of said bar relatively to said lever means; means to limit the angle to which said bar may swing relatively to said lever means; and means for rotating said shaft whereby the brakes may be applied.

5. In a brake device for a cable spool having a pair of brake drums at the ends thereof and a supporting structure in a plane below said spool, the combination of: a pair of brake bands, each surrounding one of said drums; means to anchor the dead extensions of said bands; a pair of primary levers connected to the live extensions of said bands swingable so as to constrict said bands around said drums; a pair of secondary levers connected to said primary levers; a cross bar extending between the ends of said secondary levers; flexible joints connecting the ends of said bar to said ends of said secondary levers; an actuating shaft in spaced relation to said bar; actuating lever means on said shaft connected to the central portion of said bar so that by rotation of said shaft said lever means will move said bar and swing said secondary and primary levers to constrict said bands, the connection of said lever means to said bar permitting a small swinging of said bar relatively to said lever means; means to limit the angle to which said bar may swing relatively to said lever means; and means for rotating said shaft whereby the brakes may be applied.

6. In a brake device for a cable spool having a pair of brake drums at the ends thereof and a supporting structure in a plane below said spool, the combination of: a pair of brake bands, each surrounding one of said drums and having live and dead extensions which cross below said drum, one of said extensions passing through an opening in the other of said extensions; guide means extending substantially horizontally in said supporting structure under said drums; anchor blocks movably supported by said guide means and connected to the dead extensions of said bands; means connected to the live extensions of said band to apply force to constrict the same around said drums; and adjusting screws extending forward from said anchor blocks and being actuatable at the front ends thereof to move said anchor blocks in said guide means to adjust said bands.

7. In a brake device for a cable spool having a pair of brake drums at the ends thereof and a supporting structure in a plane below said spool, the combination of: a pair of brake bands, each surrounding one of said drums and having live and dead extensions which cross below said drum; guide means extending substantially horizontally in said supporting structure under said drums; anchor blocks movably supported by said guide means and connected to the dead extensions of said bands; actuating means disposed below the forward portions of said drums and being connected to the live extensions of said bands, for constricting said bands around said drums; and adjusting screws extending forward from said anchor blocks and being actuatable at the front ends thereof to move said anchor blocks in said guide means to adjust said bands.

8. In a brake device for a cable spool having a pair of brake drums at the ends thereof and a supporting structure in a plane below said spool, the combination of: a pair of brake bands, each surrounding one of said drums and having live and dead ends disposed below said drum; guide means extending substantially horizontally in said supporting structure under said drums; anchor blocks movably supported by said guide means and connected to the dead ends of said bands; actuating means for applying a force to said live ends of said bands to constrict the same around the said drums; means for adjusting said blocks in said guide means so as to adjust the brake bands relatively to the drums; and a pair of supports for each of said bands to engage the end portions of said bands at points spaced from a vertical plane coinciding with the axis of said spool.

9. In a brake device for a cable spool having a pair of brake drums at the ends thereof and a supporting structure in a plane below said spool, the combination of: a pair of brake bands, each surrounding one of said drums and having live and dead extensions disposed below said drum; means to anchor the dead extensions of said bands; actuating means for applying a force to the live extensions of said bands to constrict the same around said drums; and a pair of supports for each of said bands to engage the end portions of said bands at points spaced from a vertical plane coinciding with the axis of said spool.

10. In a brake device for a cable spool having a pair of brake drums at the ends thereof and a supporting structure in a plane below said spool, the combination of: a pair of brake bands, each surrounding one of said drums and having live and dead extensions which cross below said drum; guide means extending substantially horizontally in said supporting structure under said drums; anchor blocks movably supported by said guide means and connected to the dead extensions of said bands; actuating means disposed below the forward portions of said drums and being connected to the live extensions of said bands, for constricting said bands around said drums; adjusting screws extending forward from said anchor blocks and being actuatable at the front ends thereof to move said anchor blocks in said guide means to adjust said bands; and a pair of supports for each of said bands to engage the end portions of said bands at points spaced from a vertical plane coinciding with the axis of said spool.

11. In a brake device for a cable spool having a pair of brake drums at the ends thereof and a supporting structure in a plane below said spool, the combination of: a pair of brake bands, each surrounding one of said drums and having live and dead ends disposed below said drum; guide means extending substantially horizontally in said supporting structure under said drums; anchor blocks movably supported by said guide means and connected to the dead ends of said bands; actuating means for applying a force to said live ends of said bands to constrict the same around the said drums; means for adjusting said blocks in said guide means so as to adjust the brake bands relatively to the drums; and a pair of adjustably mounted arms extending upward and having rollers thereon to engage the end portions of said bands at points spaced from a vertical plane coinciding with the axis of said spool.

12. In a brake device for a cable spool having a pair of brake drums at the ends thereof and a supporting structure in a plane below said spool, the combination of: a pair of brake bands, each surrounding one of said drums and having live and dead extensions disposed below said drum; means to anchor the dead extensions of said bands; actuating means for applying a force to the live extensions of said bands to constrict the same around said drums; and a pair of adjustably mounted arms extending upward and having rollers thereon to engage the end portions of said bands at points spaced from a vertical plane coinciding with the axis of said spool.

13. In a brake device for a cable spool having a pair of brake drums at the ends thereof and a supporting structure in a plane below said spool, the combination of: a pair of brake bands, each surrounding one of said drums and having live and dead extensions which cross below said drum; guide means extending substantially horizontally in said supporting structure under said drums; anchor blocks movably supported by said guide means and connected to the dead extensions of said bands; actuating means disposed below the forward portions of said drums and being connected to the live extensions of said bands, for constricting said bands around said drums; adjusting screws extending forward from said anchor blocks and being actuatable at the front ends thereof to move said anchor blocks in said guide means to adjust said bands; and a pair of adjustably mounted arms extending upward and having rollers thereon to engage the end portions of said bands at points spaced from a vertical plane coinciding with the axis of said spool.

14. In a brake device of the character described having a pair of spaced brake drums, the combination of: a pair of brake bands, each surrounding one of said drums; means to anchor the dead ends of said bands; and means to apply an actuating force to the live ends of said bands comprising a bar having its ends connected to the live ends of said bands, a force exerting member pivotally connected to the central portion of said bar, and means operative between said bar and said force exerting member for limiting the angle to which said bar may swing relatively to said force exerting member.

15. In a brake device of the character described having a pair of spaced brake drums, the combination of: a pair of brake bands, each surrounding one of said drums; means to anchor the dead ends of said bands; and means to apply an actuating force to the live ends of said bands comprising a bar having its ends connected to the live ends of said bands, an actuating lever connected to the central portion of said bar by pivot means, and means to limit the rotation of said bar on said pivot means comprising a second actuating lever connected to said first named actuating lever and having a loose connection with said bar so as to permit a limited angular movement of said bar.

16. In a brake device for a brake drum carried by a supporting structure which lies in a plane below the drum, the combination of: a brake band surrounding said drum and having its front and rear ends extending below said drum; guide means extending substantially horizontally in said supporting structure under said drum; an anchor block movably supported by said guide means and connected to the front end of said band; means for actuating the rear end of said band; and thrust means extending forwardly from said anchor block and having the front end thereof exposed at the front of said supporting structure for actuation so as to move said anchor block rearwardly in said guide means to adjust said band.

17. In a brake device for a brake drum carried by a supporting structure which lies in a plane below the drum, the combination of: a brake band surrounding said drum and having its front and rear ends extending below said drum; guide means extending substantially horizontally in said supporting structure under said drum; an anchor block movably supported by said guide means and connected to the front end of said band; means for actuating the rear end of said band; and a thrust adjusting screw extending substantially horizontally from said anchor block and having an end thereof exposed contiguous to the front margin of said supporting structure for actuation so as to move said anchor block rearwardly in said guide means.

18. In a brake device for a drum carried by a supporting structure seated in a plane below the drum, the combination of: a brake band surrounding said drum and having its ends disposed below said drum, adjustable anchor means to anchor the front end of said band; means for adjusting said anchor means, said adjusting means having a thrust member actuatable to move said anchor means, and an operating part for said thrust member positioned and being engageable at a point toward the front margin of said supporting structure; and means for applying a force to the rear end of said band to constrict the same around said drum.

19. In a brake device for a drum supported so as to rotate in a substantially horizontal axis, the combination of: a brake band surrounding said drum and having its ends disposed below the drum; means below the drum for producing relative movement of the ends of the band to constrict the same; front and rear adjustable supports to engage the end portions of said band at a point spaced from a vertical plane coinciding with the axis of the drum; means below the front portion of said drum for adjusting said front support; and means extending from a position below the front portion of said drum to said rear support operative to adjust said rear support.

20. In a brake device for a drum supported so as to rotate in a substantially horizontal axis, the combination of: a brake band surrounding said drum and having its ends disposed below the drum; means below the drum for producing relative movement of the ends of the band to constrict the same; front and rear adjustably mounted arms having rollers thereon to engage the end portions of said band at points spaced from a vertical plane coinciding with the axis of said drum, means below the front portion of said drum for moving the front arm for the purpose of adjusting the same; and means extending from a position below the front portion of said drum to said rear arm operative to move said rear arm for the purpose of adjusting the same.

GUGLIELMO R. TREMOLADA.